(12) United States Patent
Brown et al.

(10) Patent No.: US 7,707,108 B2
(45) Date of Patent: Apr. 27, 2010

(54) DETECTION OF UNAUTHORIZED ACCOUNT TRANSACTIONS

(75) Inventors: Michael Wayne Brown, Georgetown, TX (US); Rabindranath Dutta, Los Angeles, CA (US); Michael A. Paolini, Round Rock, TX (US); Newton James Smith, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2868 days.

(21) Appl. No.: 10/062,366

(22) Filed: Jan. 31, 2002

(65) Prior Publication Data

US 2003/0144952 A1    Jul. 31, 2003

(51) Int. Cl.
*G06Q 40/00* (2006.01)
(52) U.S. Cl. .............................. 705/40; 705/38; 235/379
(58) Field of Classification Search .................... 705/38; 235/379
See application file for complete search history.

(56) References Cited

U.S. PATENT DOCUMENTS

| | | | |
|---|---|---|---|
| 5,265,162 A | 11/1993 | Bush et al. | |
| 5,708,422 A | 1/1998 | Blonder | |
| 5,731,575 A * | 3/1998 | Zingher et al. | ............... 235/379 |
| 5,914,472 A | 6/1999 | Foladare et al. | |
| 6,157,920 A | 12/2000 | Jakobsson et al. | |
| 6,167,251 A | 12/2000 | Segal et al. | |
| 6,195,541 B1 | 2/2001 | Griffith | |

\* cited by examiner

*Primary Examiner*—James P Trammell
*Assistant Examiner*—Sanjeev Malhotra
(74) *Attorney, Agent, or Firm*—Libby Handelsman; Cynthia G. Seal; Jeffrey L. Streets

(57) ABSTRACT

Account transaction protection is provided during the automated authorization process of a charge account, a debit account, a personal account or a business account. After a vendor asks the authorization service provider to approve a pending transaction, the authorization service provider automatically contacts an account holder asking for approval or refusal of the pending transaction. The contact is made by telephone, or computer network, such as the Internet. After entering a PIN to establish identity, the account holder approves or rejects the pending transaction after receiving a validation request message detailing the facts of the transaction. The PIN may be a normal PIN or a duress PIN. If the duress PIN is used, indicating the account holder is under duress to approve the pending transaction, the service provider notifies the authorities. Similarly, if the account holder indicates that refusal is due to unauthorized use, the service provider contacts the authorities.

47 Claims, 4 Drawing Sheets

DETECTION OF UNAUTHORIZED ACCOUNT TRANSACTIONS

BACKGROUND OF THE INVENTION

1. Field of the Invention

The present invention relates to an account transaction and authorization system and more particularly to a method and computer program product requiring an account owner to authorize a pending transaction.

2. Description of the Related Art

There are many credit and debit card providers issuing particular types of transaction cards to their customers. Customers present these cards to merchants to charge goods and services, as well as for distribution of currency, to the cardholder's account. To authorize a transaction, a merchant will typically contact the issuer of the card for authorization to apply the cost of the transaction to the cardholder's account.

When a holder of a credit or debit transaction card presents the card to a merchant in order to purchase goods, services or distribution of currency, some form of authorization by the card issuer is typically sought by the merchant to minimize theft and risk of loss to the merchant. For this purpose, electronic authorization networks have been developed wherein a merchant uses a terminal to read account information encoded on a magnetic strip located on the back of the transaction card. The terminal then automatically calls or otherwise communicates with a central processor, connected to the network, that analyzes the authorization request. The call from the terminal is typically routed through a local financial institution or transaction card issuer.

The central processor, upon receipt of the call from the merchant, may initiate an electronic data link to the processor operated by the transaction card issuer to determine if the transaction should be approved or denied. The processor at the transaction card issuer may check the status of the account within its database and consider the status of the account in generating a response. This response is then routed back to the merchant's terminal, typically in the form of an approval code or denial code.

Debit and credit cards have been heralded as the start of a cashless society where people no longer will carry cash but instead, transact all their business with credit or debit cards, thereby lowering the risk of losing or being robbed of their cash. This trend has led to implementing methods to protect against transaction card fraud and to prevent the unauthorized use of transaction cards. For example, a transaction card holder is often required to provide a secret personal identification number (PIN) at the point of sale to ensure that the transaction card holder presenting the card to the merchant is an authorized user of the account, and not an imposter. While these systems may help minimize the fraudulent use of credit and debit cards, they have led to an increase in the incidence of thieves forcing a cardholder, under duress, to provide the PIN associated with a given card.

Therefore, there is a need for an account authorization system capable of deterring or detecting this type of crime. It would be an advantage if the system would immediately alert the authorities of the crime in progress. It would be desirable if this alert went undetected by the perpetrator of the crime.

SUMMARY OF THE INVENTION

The present invention provides a method for detecting the unauthorized use of an account, comprising receiving a request from a vendor to authorize an account transaction; sending a request for authorization to an account holder; receiving a first electronic response from the account holder providing a personal identification number selected from a normal personal identification number and a duress personal identification number; sending an instruction based upon the first electronic response to at least one party selected from the transaction card issuer, vendor, police, security, emergency contact or combinations thereof; and initiating remedial actions if the duress personal identification number is received. The method further comprises requesting approval or refusal of the account transaction from the account holder, via a validation request message, and receiving a second electronic response from the account holder indicating approval or refusal of the account transaction. The account may be a transaction card account (such as a debit card account or credit card account), personal account, business account, or combinations thereof. The account transaction may be selected from charging an account for goods, services or cash distributions for payment at a later date or by debiting an account for goods, services or cash distributions at the time of the account transaction and may occur at a point selected from a point of sale, a point of distribution, the Internet, a telephone and combinations thereof.

The request sent by the vendor to the card issuer, or an agent of the card issuer, asking for authorization of an account transaction, contains information selected from an account number, an amount to be charged against the account, an amount to be debited from the account, a vendor code or combinations thereof. After the request is received by the authorization computer of the card issuer, the authorization computer retrieves information based upon the account number and the vendor code from a validation database, wherein the information is selected from an account holder record, a vendor record, or combinations thereof. The account holder record contains information selected from the account number, a contact address, a duress personal identification number, a normal personal identification number, account holder preferences, billing address and combinations thereof. The vendor record contains information selected from the vendor code, vendor name, vendor address, vendor preferences, business type or combinations thereof. The authorization computer contacts the account holder at the contact address retrieved from the account holder preferences in the validation database, provides details of the transaction, and then requests the account holder to provide his personal identification number.

After retrieving the account holder record and the vendor record, the authorization computer compares the first response personal identification number with at least two stored personal identification numbers in an account holder preferences stored in a validation database; confirms that the first response personal identification number matches one of the at least two stored personal identification numbers, and determines from the comparison whether the first response personal identification number is the normal personal identification number or the duress personal identification number. The at least two stored personal identification numbers include a stored normal personal identification number and a stored duress personal identification number. After receiving a valid personal identification number, the authorization computer informs the account holder of the pending account transaction, the location of the transaction, and an amount for the account transaction, and requests approval of the transaction.

If the authorization computer determines that the first response was a normal personal identification number, then the step of sending the instruction to the vendor further comprises sending authorization for the account transaction to the vendor if the second electronic response was approval of the account transaction. If the second electronic response was refusal of the account transaction, then the authorization computer requests of the account holder whether the account transaction is suspected to be an unauthorized use and the account holder then provides a third electronic response indicating whether the refusal is due to suspected unauthorized use. If the refusal is not based upon suspected unauthorized use, then the authorization computer sends the instruction to the vendor refusing authorization.

If, however, the third electronic response indicates that the refusal was due to suspected unauthorized use, then the authorization computer retrieves the vendor preferences for unauthorized use from a validation database, notifies the authorities or an emergency contact as listed in the vendor preferences, and sends the instruction to the vendor as directed in the vendor preferences, wherein the instruction is selected from approving authorization or refusing authorization.

When the first electronic response is the duress personal identification number, the step of initiating remedial actions by the authorization computer further comprises retrieving the account holder preferences for duress from a validation database, notifying authorities or an emergency contact as listed in the account holder preferences, and sending the instruction to the vendor as listed in the account holder preferences. In addition, where the electronic responses are being made via telephone, an optional remedial action includes making the telephone's microphone active, both during and after the transaction, so that sounds and conversations at the point of duress can be monitored by authorities or emergency contacts.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

Figure 1:
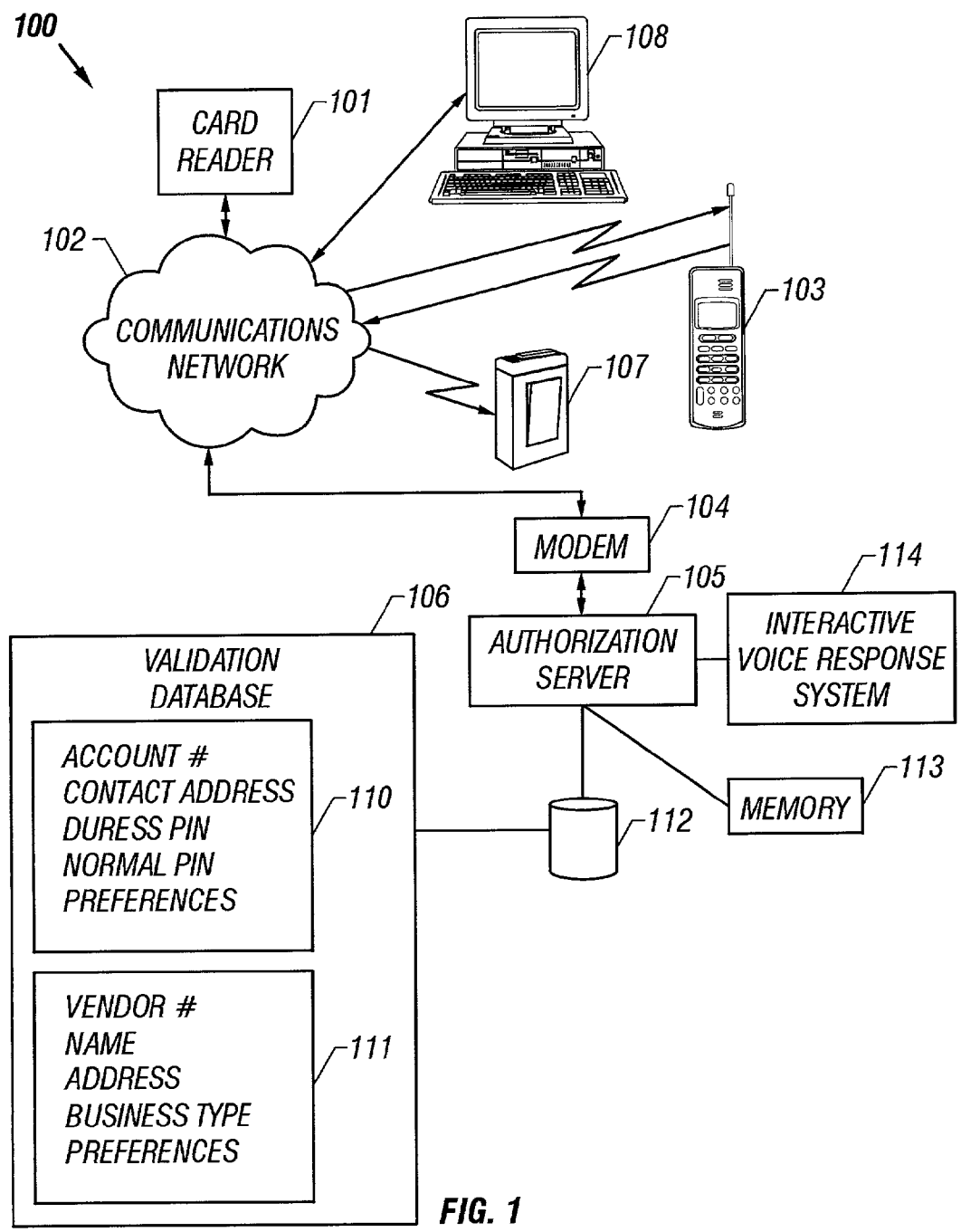
FIG. 1 is a schematic diagram of a system that may be used to implement the present invention.

The present invention provides a method of detecting the unauthorized use of an account, especially under duress conditions. The account may be a transaction card account, a personal account or a business account. Duress conditions may occur when a person is being forced, for example, under threat of immediate bodily harm, to provide access to an account, such as by purchasing goods on a transaction card.

When a transaction card is presented to a vendor for payment of goods or services, the vendor normally must obtain authorization from the card issuer for each transaction. In accordance with the present invention, the account holder must also authorize each transaction.

If the account holder is present at the point of the transaction, as will be the case when the person presenting the card is also the account holder, then the vendor may request the account holder's authorization of the transaction. The account holder authorization can be indicated by providing or entering a secret normal PIN associated with the subject account. Consequently, the account holder authorization may be submitted to the card issuer along with the typical vendor request for authorization from the card issuer. The vendor typically requests authorization from the card issuer by sending the card number, the amount of the transaction, and a vendor identification code that may be used by the card issuer to credit the transaction amount to the vendor's account. Upon receiving the vendor request, the card issuer retrieves information from a database concerning the account to assist with a determination of whether the authorization request should be approved or denied. For example, even if the account holder authorized a transaction, the card issuer may still deny the transaction on the basis of past due payments or expiration of the account.

If the account holder is not present at the point of the transaction, then the vendor submits the typical vendor request for authorization from the card issuer as set out above. However, the card issuer retrieves the account information, including a contact number for a telephone or other messaging means, enabling the card issuer to contact the account holder for authorization of the account transaction. In order to obtain authorization from the account holder, the account holder is requested to enter a normal personal identification number for identification purposes. Upon successful entry of a correct normal PIN associated the subject account, the card issuer provides the account holder with information comprising, for example, the amount of the transaction and the vendor's identification. The account holder may then approve the account transaction. The account holder authorization may then be considered by the card issuer along with other relevant factors to determine whether the transaction should be accepted or denied.

Recognizing, however, that the account holder may be under duress at the time that the authorization is being requested, for example being forced to approve the account transaction under threat of immediate bodily harm, the present invention provides for the account holder to enter a duress personal identification number, rather than a normal personal identification number, to inform the card issuer of the duress situation. The card issuer may then notify the authorities or an emergency contact of the duress situation without alerting the perpetrator who is causing the duress to the fact that notification has been given. In accordance with the invention, the option of entering a duress PIN or a normal PIN is available to the account holder during the account holder authorization request whether the account holder is present at the point of the transaction or at a remote location.

FIG. 1 is a schematic diagram of a system that may be used to implement the present invention. When an authorized user of an account decides to purchase goods or services with a transaction card, the user "swipes" the card or presents the card to the vendor who "swipes" the card through a card reader 101 to read the transaction card number, for example, off the magnetic strip on the back of the card. An automatic dialing unit included in the card reader 101 dials a telephone number associated with the card issuer, or other authorization service provider, and connects to the authorization server 105 through a communications network 102.

Figure 2:
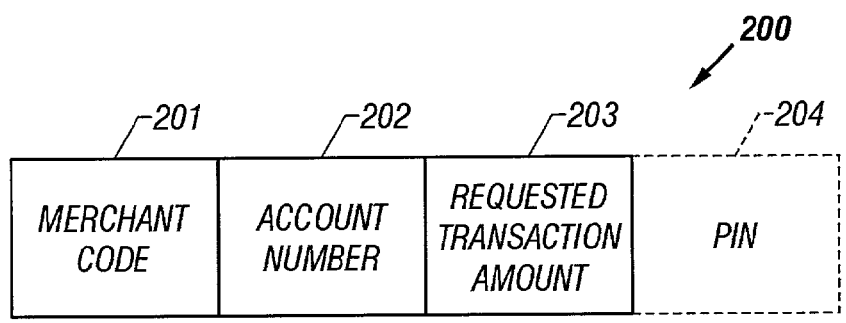
FIG. 2 is an exemplary message that is transmitted by an automatic dialing unit at a vendor's location to a card issuer's validation database.

In particular, the card reader 101 transmits to the authorization server 105 a validation request message that is illustratively represented in FIG. 2. The authorization server 105 contains a validation database 106 that stores information used in the authorization process. The communications network 102 may include permanent connections, such as wire or fiber optics cables, or temporary connections made through telephone or wireless communications. Furthermore, the system 100 may include the Internet, representing a worldwide collection of networks and gateways that use the TCP/IP suite of protocols to communicate with one another. The system 100 may also utilize a number of different types of networks, such as, for example, an intranet, a local area network (LAN), a wide area network (WAN), or a wireless network. It should be noted that the system 100 might include additional servers, clients, routers and other devices not shown.

The authorization server 105 may be one or more mainframe computers, personal computers, any computers having a processor and sufficient memory to store the validation database 106, or combinations thereof. It will be appreciated from the description below that the present invention may be implemented in software that is stored as executable instructions on a computer readable medium on the authorization server's system, such as a mass storage device 112 or in memory (RAM) 113. These instructions would include, for example, an operating system program and application programs.

Optionally, the authorization server may be a part of an account validation service that connects to another authorization server or processor of the card issuer that then provides the validation database for a given cardholder. Furthermore, the present invention is not limited only to account transactions where a transaction card is presented to the vendor at the point of sale. The present invention may be used for telephone transactions, Internet transactions, or any transaction involving the use of an account being charged for goods, services or cash distributions that delay payment until a later date, or the immediate debiting of an account, such as, for example, a debit card.

The validation request message 200 shown in FIG. 2 includes a merchant code 201, an account number 202, a requested transaction amount 203. The merchant code 201 is a field that identifies the merchant in the validation database so that the merchant's name, address, preferences and type of business, such as, for example, grocery store, department store or restaurant may be determined. Typically, the merchant code 201 is supplied by the card reader 101, and the account number is retrieved from the magnetic strip on the back of the card. The transaction amount 203 is entered by the vendor or may be read directly from the cash register. Furthermore, the validation request message 200 may include a PIN 204, if the account holder was available to enter one at the point of the transaction as described above.

The authorization server 105 contains the validation database 106 on a mass storage device 112. Records for each cardholder and vendor are maintained in the validation database 106. In accordance with the invention, a typical cardholder record 110 may contain information comprising the account number, a contact address for the account holder, a duress personal identification number (PIN), a normal PIN, a set of preferences and other information including, for example, the name and billing address of the account holder and a listing of other authorized card users. A typical vendor record 111 may contain information comprising, for example, the vendor number that is transmitted with the transaction card account number requiring authorization, the vendor's name and address, vendor preferences and the vendor's business type.

After the authorization server has received the validation request message 200 from the vendor, the authorization server searches the validation database 106 for the account number and retrieves the cardholder record 110 associated with that account number. The server also searches for the vendor record 111 associated with the vendor code 201 contained in the validation request message 200.

If the validation request message 200 does not include a PIN 204 from the account holder, then the authorization server 105 uses the contact address contained in the cardholder record 110 to contact the account holder for that account. The contact address may be a pager number, telephone number, mobile telephone number, an email address, an Internet address, or an intranet address. The authorization server can determine from the type of address whether to use, for example, the telephone system or the Internet, to contact the account holder for the account. The server then sends a message to the account holder at the contact address to inform the account holder of the pending account transaction and to request approval of the transaction.

The account holder may receive the message at the contact address using such devices as, for example, a pager, a telephone, a mobile telephone, a laptop computer, a personal computer, a personal digital assistant, or any other device capable of receiving a message through a computer network, a telephone system, or other communications network. The pager 107 may be a one-way pager, capable of receiving a message only, or it may be a two-way pager, capable of sending and receiving messages. If the pager is a one-way pager, then the authorization server will retrieve that information from the validation database and include in the pager message a contact number and reference code for the account holder to call. The account holder may then call the contact number and receive the authorization request message from the authorization server. If the contact address is for a device 108 connected to a computer network, such as the Internet, the device may receive messages either as conventional electronic mail or in other forms of electronic communication such as, for example, a direct message communicated to the computer screen of a logged on person or an interactive electronic two-way communication mechanism such as, for example, a "chat" or "talk" program or instant messaging. Any special instructions necessary to establish two way communication between the authorization server and the account holder are included in the validation database so that the server can establish communication with the account holder during the authorization process.

Communication between the account holder and the authorization server may be through messages recorded on the server to be played back over a telephone system or messages displayed on an account holder's screen Preferably, an Interactive Voice Response System (IVRS) 114 is used for communication over a telephone system to a mobile or line based telephone of the authorized user. The IVRS delivers voice messages to the authorized user at, for example, a mobile telephone 103. Specifically, IVRS is an application program that may be run on the authorization server that executes text-to-speech synthesis programmed instructions using ASCII input to generate an audio rendition of that ASCII input in a machine synthesized voice. Therefore, for example, after retrieving the vendor's name, address, and business type from the validation database and the dollar amount of the pending transaction from the request for authorization message, the IVRS may insert this information in a preset format for conveying this information through voice synthesized audio to the account holder. IVRS also prompts the account holder to provide input of the PIN number and approval or disapproval of the pending transaction. For example, using the mobile telephone keypad, the account holder may be prompted to enter the PIN and then, after listening to the authorization server's authorization request message, prompted to enter a "1" to approve the pending transaction or a "2" to reject the pending transaction. Also included in the IVRS 114 is a means to respond to touch-tone commands from a caller. In particular, IVRS is arranged to translate the Dual Tone Multi-Frequency (DTMF) signals received from the account holder to a machine-readable format that is recognizable by the authorization server 105.

When either the account holder receives the validation request message at a remote location or a request to authorize the transaction at the point of the transaction, the authorization server will require, as a first response, that the account holder enter a personal identification number (PIN) to ensure that the person responding is the account holder. The personal identification number may be selected from a normal PIN or a duress PIN. The normal PIN merely identifies the person as the account holder. The duress PIN both identifies the person as the account holder and further indicates that the account holder is responding to the validation request message under duress, that a person is threatening immediate bodily harm or other serious threat if the account holder does not approve the pending transaction. In either case, whether the duress PIN or the normal PIN is provided to the authorization server, the server will respond outwardly in exactly the same way to the account holder so as not to alert the person who is causing the threat. However, as discussed below, further steps will be taken to alert authorities to the duress situation.

The user's duress PIN will preferably have a format that is similar to that of the user's normal PIN, so that it is improbable that anyone observing the user's entry of the duress PIN on the key pad would know that the user's duress PIN was entered since the number sequence is not readily identifiable. In particular, the duress PIN and normal PIN should contain the same number of characters and the same type of characters. Especially since the duress PIN results in the dispensing of cash, the thief will presumably have no reason to suspect an alarm has been triggered.

In one embodiment, the system accepts a PIN having a certain number of digits assigned to identify the user and a certain number of digits that are option codes. The option codes may allow the user to initiate a variety of predetermined actions or enter a variety of predetermined information. The predetermined actions may include, without limitation, setting an alarm, taking a picture, triggering a false error message, and calling a friend or neighbor. Such predetermined actions are only limited by the nature of electronic communications and control, how widely the electronic communication of the network will reach, and the authority that the user has provided to facilitate the requested actions. The predetermined information may include, without limitation, the type of the user's duress, the number of thieves, the type of weapons carried by the thieves, and how many people are present. For example, assume that a PIN is made up of five digits, the first four digits being dedicated to a unique identification number or password associated with the account, and the fifth digit dedicated to a predetermined option code. Continuing with the example, the predetermined option codes may include: "0" to indicate no duress; and "1" through "9" to indicate duress, where the exact number entered indicates the number of thieves present. Consequently, a PIN entry of "84632" would be entered if the unique identification number was "8463" and the transaction was being made under duress with "2" thieves present. Optionally, some digits may be dedicated to other user-defined action or information as set out in the user's preferences registered and maintained by the card issuer. In accordance with this format, it is possible to have more than one "normal PIN" and/or more than one "duress PIN".

The server compares the PIN provided by the account holder with the PINs previously stored in the database in association with the subject account. If a matching PIN is not provided, then the server will instruct the vendor not to proceed with the pending transaction, normally by sending a message for display on the card reader stating that the vendor's request for authorization was denied. If, however, a matching PIN is provided, then the server will provide information concerning the pending transaction to the account holder for approval. Such information may contain, for example, the name and address of the vendor, the dollar amount of the transaction, the number of transactions authorized that day, the dollar amount of transactions authorized that day, and other information that may be deemed important by the account holder and the card provider. The account holder may then, in a second response, either reject or approve the pending transaction. If the second response is for approval, then the server will log that approval in the database and provide an instruction to the vendor to proceed with the transaction, normally by sending a message for display on the card reader stating the approval. If, however, the second response from the account holder is for rejection, then the authorization server will further query whether the rejection is for suspected unauthorized use of the account. Unauthorized use is defined as criminal activity involving, for example, a stolen transaction card, fraud, or similar activity. If, in a third response, the account holder acknowledges that the rejection was not for unauthorized use, then the server sends an instruction to the vendor to cancel the pending transaction, normally by sending a message for display on the card reader stating the rejection. If, however, on the third response the account holder acknowledges that the rejection was based on suspected unauthorized use, then the server would send the reject message to the vendor as well as take other covert steps to notify authorities as discussed below.

As stated previously, the present invention applies to account transactions beyond those involving presentation of a transaction card to the vendor at the point of sale. If the transaction is occurring via the Internet or telephone, for example, the vendor would still contact the authorization server but through a different means other than a card reader. Any means of communicating the account number and the authorization process between the vendor and the authorization server is acceptable including, for example, use of the Internet or a telephone system, keying in an account number on a computer or a telephone keypad, or speaking the account number. The authorization response from the authorization server may be communicated in any similar manner.

An advantage of the present invention is that authorities or emergency contacts may be notified quickly that a crime is in progress rather than a month later after a credit card bill has been received and the perpetrator has moved on to another area. A further advantage is that a person being forced to purchase items or withdraw cash under duress may summon help quickly but quietly so as not to alert the perpetrator. In both cases discussed above, whether the duress PIN is used or whether, in the third response, the account holder indicates that an unauthorized person is accessing the account, the authorization server follows similar procedures as discussed below.

If the account holder uses the duress PIN, the authorization server retrieves the preferences from the cardholder record. The cardholder preferences include information that may be valuable for authorities to know in a duress situation and also provide instructions for the authorization server to follow upon receiving a duress PIN response. The information may include the name and number of a friend or relative to contact, a list of possible perpetrators, and other information deemed important by the account holder or the card issuing company. The server then attempts to determine the location of the person, based upon the contact address, vendor address, or information contained in the cardholder preferences, and informs the authorities in that area about the crime in progress and alerting them to the information contained in the cardholder preferences and the name and address of the vendor having the pending account transaction. Alternatively, the server may notify a person designated in the cardholder preferences to be notified whenever a duress PIN is received, enabling that designated person to notify the authorities with the information from the server. It should be noted that all communications between the authorization server and the authorities, or other parties or emergency contacts, may be conducted similarly to the communications between the authorization server and the account holder; for example, an Interactive Voice Response System may be used.

The authorization server may then, after attempting to notify the authorities or others as designated in the cardholder preferences, send the vendor an instruction authorizing the pending account transaction in the duress situation, the approval response being exactly the same as when the normal PIN is used so as not to alert the person exerting the duress. Alternatively, the server may employ a delaying tactic, such as waiting for a predetermined time period before approving the transaction, to provide authorities more time to arrive at the vendor's location before the perpetrator has been able to escape.

If the account holder indicates an unauthorized account usage without duress, the authorization server retrieves the preferences of the vendor from the vendor's record, determines the preferences and contact information that the vendor wishes the server to use to notify the authorities of a crime in progress, and then the server implements those instructions similarly as to the embodiment of the duress situation.

It is recognized that, especially in those transactions not involving a credit or debit card at the point of sale, the account holder may be under duress at a different location or the person accessing the account for unauthorized use may be at a different location than the point of sale. The authorization server, however, passes the information it possesses on to the authorities for the authorities to act upon. Each vendor, account holder, and account issuer may tailor their preferences to better provide information to the authorities that may be helpful to the authorities in these situations. Additional information may include, for example, a telephone number being used by the perpetrator that is captured through caller ID, an Internet IP address, or a screen name being used by the perpetrator.

Figure 3A:
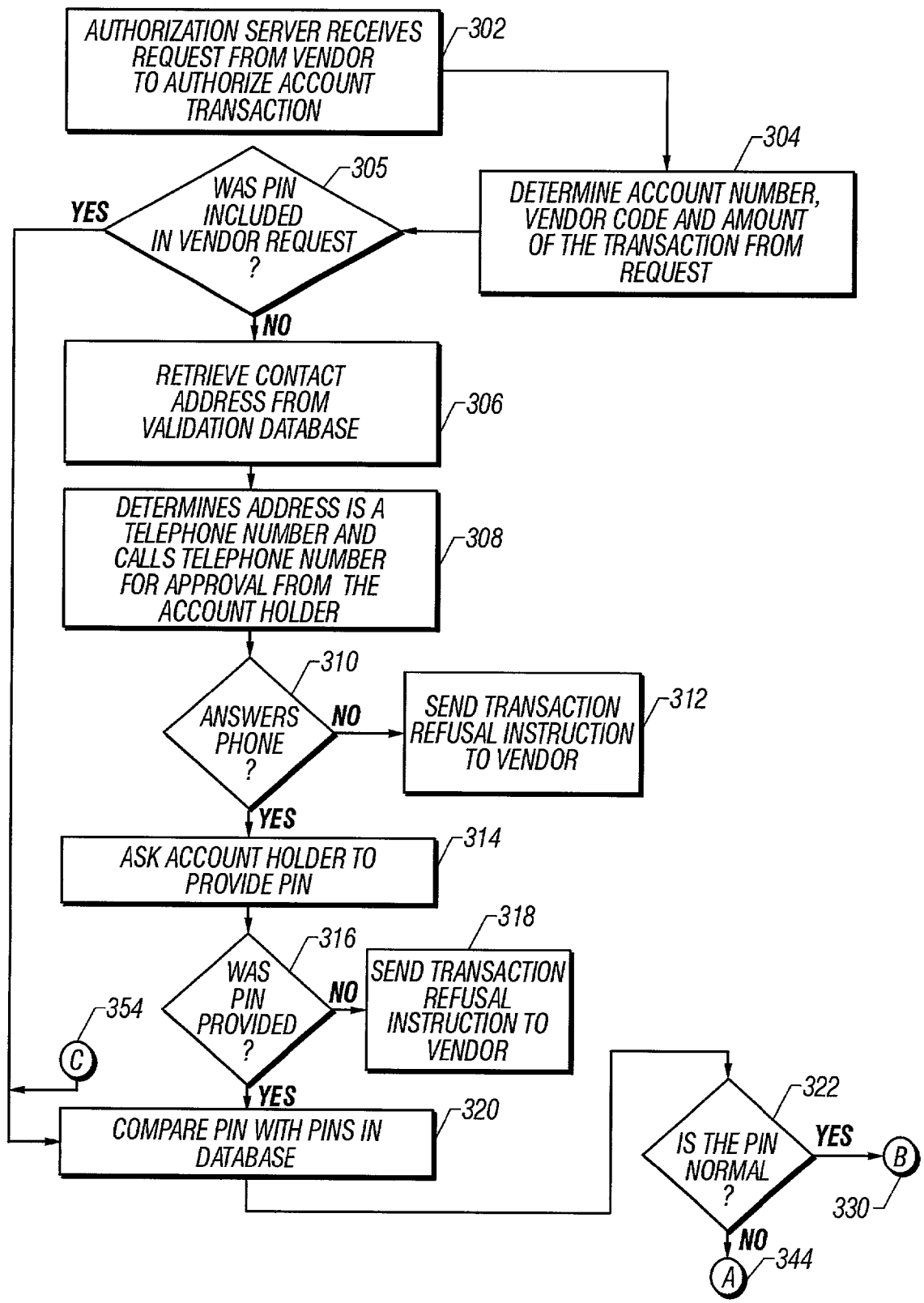
FIGS. 3A-3C are a flowchart of an exemplary method for account transaction and authorization in accordance with the present invention.

FIG. 3A is a flow chart of an exemplary method that may be executed on the system shown in FIG. 1. In state 302, the authorization server receives a request from a vendor for authorizing an account transaction. In state 304, the authorization server examines the request and determines the vendor code, account number, and the amount of the pending account transaction. In state 305, the authorization server examines the request and determines whether a PIN was included in the vendor request. If the vendor request was not included in the vendor request, then in state 306, the authorization server retrieves the contact address registered for the account from the validation database. In state 308, the authorization server determines the type of contact address, such as a telephone number, and sends an appropriate communication, for example calling the telephone number, to contact the account holder for approval. If, in state 310, the account holder is not reached, then in state 312, the authorization server sends an instruction to the vendor to refuse the pending transaction. If, in state 310, the account holder is reached, then in state 314, the authorization server requests the account holder to provide a PIN for identification. If, in state 316, the account holder does not respond, then in state 318, the authorization server sends an instruction to the vendor to refuse the pending transaction. If the account holder does respond in state 316, such as by depressing keys on the keypad of the telephone to provide the PIN, or if the PIN was provided in the vendor request as determined in state 305, then in state 320, the authorization server compares the PINs provided by the account holder with the PIN stored in the validation database as part of the cardholder record.

Figure 3B:
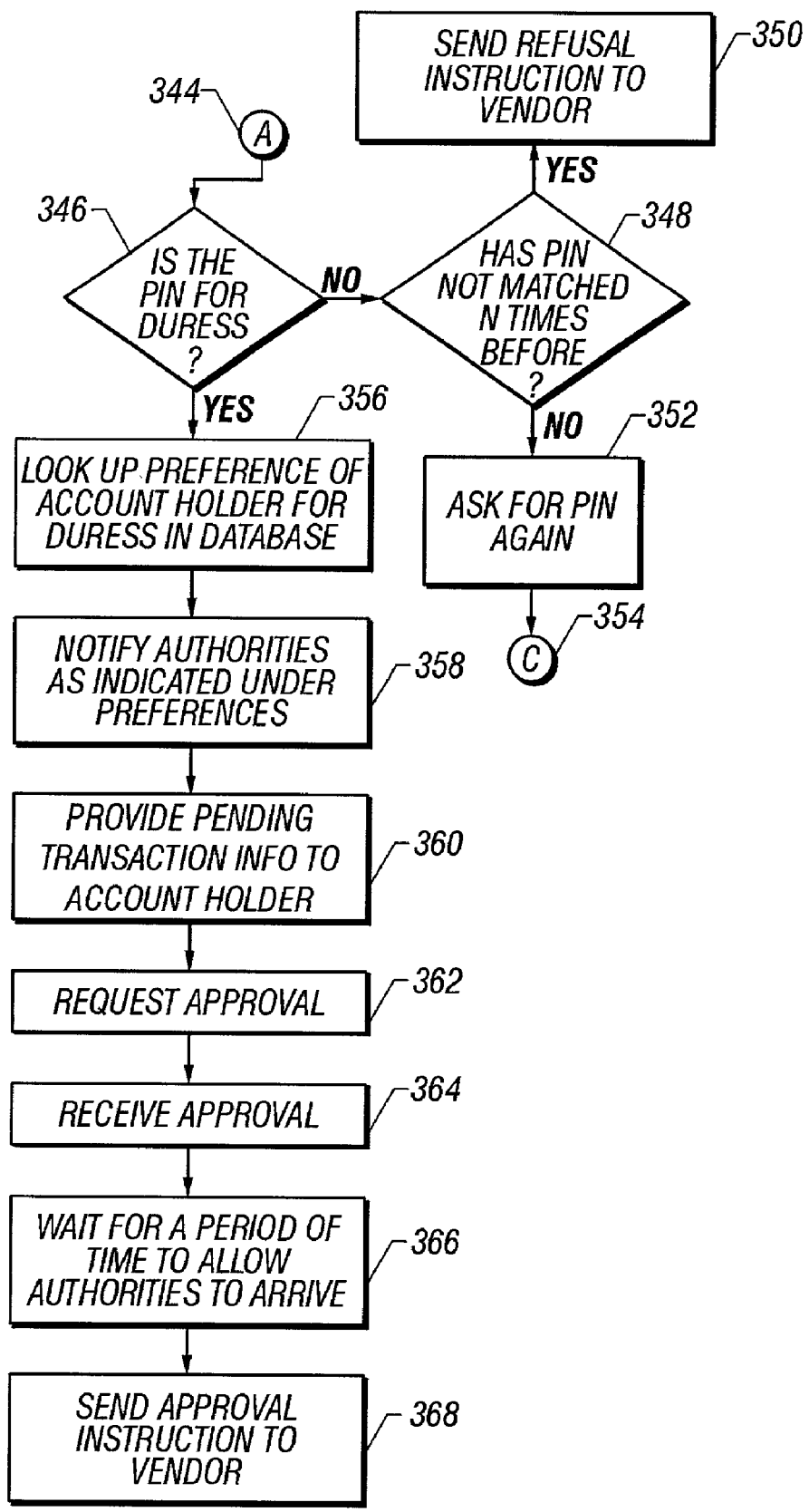
Figure 3C:
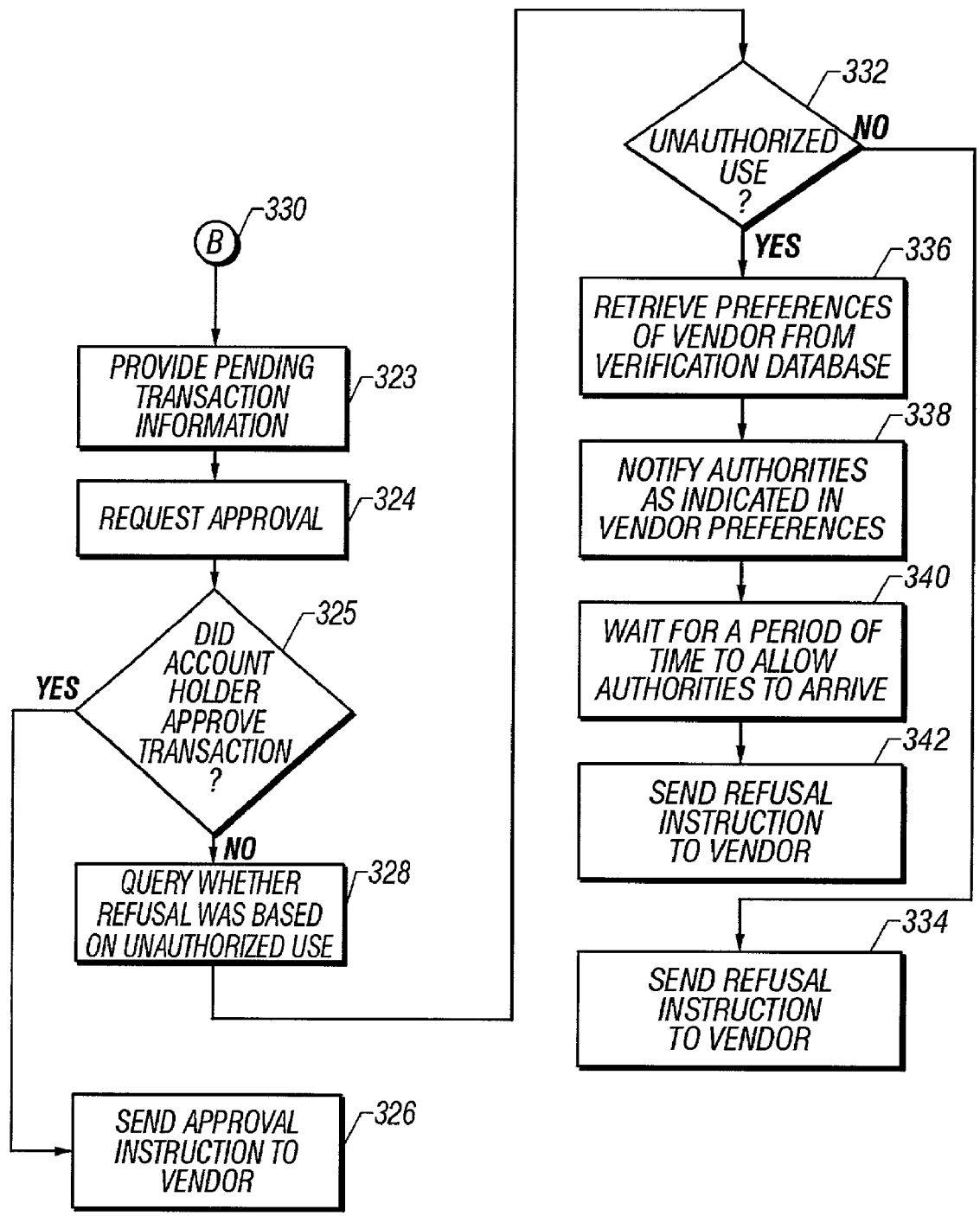

If, in state 322, the PIN is a normal PIN, then the method continues in state 330 over to FIG. 3C. Next, in state 323, the authorization server provides the account holder with details of the pending transaction. The details may include, for example, the name and address of the vendor, the amount of the transaction, and the account history over the last 24 hours. In state 324, the authorization server then requests the account holder to accept or reject the pending transaction by pressing the keys on the keypad, for example, a "1" for approval or a "2" for rejection. If, in state 325, the account holder approves the transaction, then in state 326, the authorization server sends an approval message to the vendor. If, in state 325, the account holder does not approve the pending transaction, then in state 328, the authorization server queries whether the refusal was based upon suspected unauthorized use. If, in state 332, the response from the account holder is that the refusal was not based upon suspected unauthorized use, then in state 334, the method ends with the authorization server sending an instruction to the vendor refusing the pending transaction. If, in state 332, the response indicates there was suspected unauthorized use, then in state 336, the authorization server retrieves the vendor's preferences from the vendor record in the validation database. The vendor's preferences may include telephone numbers for the local authorities or emergency contacts, telephone numbers for local security providers, telephone numbers for manager notification, and other instructions agreed upon by the card issuer and the vendor. In state 338, the authorization server notifies the authorities at the telephone numbers indicated in the vendor's preferences. In state 340, the authorization server waits a predetermined length of time as defined in the vendor's preferences before, in state 342, sending a refusal instruction to the vendor. The waiting period provides time for authorities to arrive at the vendor's address hopefully, before the perpetrator leaves.

Now returning to FIG. 3A, if in state 322 the PIN number is not normal, then the method continues in state 344 to FIG. 3B. If, in state 346, the PIN number is not for duress, then in state 348, the authorization server determines whether the account holder has had more than a preset number of opportunities to submit a valid PIN number. If, in state 348, the account holder has not exceeded the preset number of opportunities, then the authorizing sever will again request the account holder to provide a PIN number and, in state 354, the method continues from states 320 to 348 as discussed above. If, in state 348, the account holder has exceeded the preset number of opportunities to provide a valid PIN number, then in state 350, a refusal instruction is sent to the vendor for the pending transaction.

If, in state 346, the PIN number is a duress PIN number, then in state 356, the authorization server retrieves the preferences from the cardholder record. These preferences may contain contact numbers for a friend or relative and instructions to take other actions. In state 358, the authorization server contacts the relevant authorities to report the crime in progress. To appear to the perpetrator that no authorities have been alerted, in state 360, the authorization server provides information on the pending transaction to the account holder and in state 362, requests approval of the transaction. In state 364, the authorization server receives the approval from the account holder. In state 366, the authorization server waits a predetermined length of time, as stated in the cardholder's preferences, and then, in state 368, an approval instruction is sent to the vendor.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method for detecting unauthorized use of an account comprising:
   receiving a first request from a vendor to authorize an account transaction;
   sending a second request for authorization to an account holder;
   receiving a first electronic response from the account holder providing a personal identification number selected from a normal personal identification number and a duress personal identification number; and
   initiating remedial actions if the duress personal identification number is received.

2. The method of claim 1, further comprising:
   requesting approval or refusal of the account transaction from the account holder via a validation request message; and
   receiving a second electronic response from the account holder indicating approval or refusal of the account transaction.

3. The method of claim 1, wherein the first request contains information selected from an account number, an amount to be charged against the account, an amount to be debited from the account, a vendor code or combinations thereof.

4. The method of claim 3, further comprising:
   retrieving information based upon the account number and the vendor code from a validation database, wherein the information is selected from an account holder record, a vendor record, or combinations thereof.

5. The method of claim 4, wherein the account holder record contains information selected from the account number, a contact address, a duress personal identification number, a normal personal identification number, account holder preferences, billing address and combinations thereof.

6. The method of claim 4, wherein the vendor record contains information selected from the vendor code, vendor name, vendor address, vendor preferences, business type or combinations thereof.

7. The method of claim 1, wherein the account is selected from transaction card account, personal account, or business account.

8. The method of claim 1, wherein the account transaction is selected from charging an account for goods, services or cash distributions for payment at a later date or by debiting an account for goods, services or cash distributions at the time of the account transaction.

9. The method of claim 1, wherein the account transaction occurs at a point selected from a point of sale, a point of distribution, the Internet, a telephone or combinations thereof.

10. The method of claim 1, further comprising:
    comparing the first response personal identification number with at least two stored personal identification numbers in an account holder preferences stored on a validation database;
    confirming that the first response personal identification number matches one of the at least two stored personal identification numbers, and
    determining from the comparison whether the first response personal identification number is the normal personal identification number or the duress personal identification number, wherein the at least two stored personal identification numbers include a stored normal personal identification number and a stored duress personal identification number.

11. The method of claim 2, wherein the first response was a normal personal identification number, the method further comprising:
    sending authorization for the account transaction to the vendor if the second electronic response was approval of the account transaction.

12. The method of claim 2, wherein the first response was a normal personal identification number, the method further comprising:
    requesting whether the account transaction is suspected unauthorized use if the second electronic response was refusal of the account transaction; and
    receiving a third electronic response indicating whether the refusal is due to suspected unauthorized use.

13. The method of claim 12, wherein unauthorized use is selected from fraud, stolen transaction card, or combinations thereof.

14. The method of claim 12, further comprising:
    sending an instruction to the vendor refusing authorization if the third electronic response indicates that the refusal was not due to unauthorized use.

15. The method of claim 12, wherein the third electronic response indicates that the refusal was due to suspected unauthorized use, the method further comprising:
    retrieving vendor preferences for unauthorized use from a validation database;
    notifying authorities as listed in the vendor preferences; and
    sending an instruction to the vendor as directed in the vendor preferences, wherein the instruction is selected from approving authorization or refusing authorization.

16. The method of claim 2, wherein the first electronic response was the duress personal identification number, the step of initiating remedial actions further comprises:
    retrieving account holder preferences for duress from a validation database;
    notifying authorities as listed in the account holder preferences, and
    sending an instruction to vendor as listed in the account holder preferences, wherein the instruction is selected from approving authorization or refusing authorization.

17. The method of claim 2, wherein the step of contacting the account holder further comprises:
    retrieving a contact address from an account holder preferences in a validation database;
    contacting the account holder at the contact address; and
    requesting the account holder to provide the personal identification number.

18. The method of claim 17 further comprising:
    informing the account holder of the pending account transaction;

informing the account holder of a location and an amount for the account transaction.

19. The method of claim 17, wherein the contact address is selected from a telephone number, a mobile telephone number, a pager number, an Internet address, an email address, an intranet address or combinations thereof.

20. The method of claim 17, wherein a device used by the account holder to receive the validation request message is capable of receiving the validation request message through a communications network.

21. A computer program product comprising:
receiving instructions for receiving a first request from a vendor to authorize an account transaction;
sending instructions for sending a second request for authorization to an account holder;
receiving instructions for receiving a first electronic response from the account holder providing a personal identification number selected from a normal personal identification number and a duress personal identification number; and
initiating instructions for initiating remedial actions if the duress personal identification number is received.

22. The computer program product of claim 21, further comprising:
requesting instructions for requesting approval or refusal of the account transaction from the account holder via a validation request message; and
receiving instructions for receiving a second electronic response from the account holder indicating approval or refusal of the account transaction.

23. The computer program product of claim 21, wherein the first request contains information selected from an account number, an amount to be charged against the account, an amount to be debited from the account, a vendor code or combinations thereof.

24. The computer program product of claim 23, further comprising:
retrieving instructions for retrieving information based upon the account number and the vendor code from a validation database, wherein the information is selected from an account holder record, a vendor record, or combinations thereof.

25. The computer program product of claim 24, wherein the account holder record contains information selected from the account number, a contact address, a duress personal identification number, a normal personal identification number, account holder preferences, billing address and combinations thereof.

26. The computer program product of claim 24, wherein the vendor record contains information selected from the vendor code, vendor name, vendor address, vendor preferences, business type or combinations thereof.

27. The computer program product of claim 21, wherein the account is selected from transaction card account, personal account, business account.

28. The computer program product of claim 21, wherein the account transaction is selected from charging an account for goods, services or cash distributions for payment at a later date or by debiting an account for goods, services or cash distributions at the time of the account transaction.

29. The computer program product of claim 21, wherein the account transaction occurs at a point selected from a point of sale, a point of distribution, the Internet, a telephone or combinations thereof.

30. The computer program product of claim 21, further comprising:
comparing instructions for comparing the first response personal identification number with at least two stored personal identification numbers in an account holder preferences stored on a validation database;
confirming instructions for confirming that the first response personal identification number matches one of the at least two stored personal identification numbers, and
determining instructions for determining from the comparison whether the first response personal identification number is the normal personal identification number or the duress personal identification number, wherein the at least two stored personal identification numbers include a stored normal personal identification number and a stored duress personal identification number.

31. The computer program product of claim 22, wherein the first response was a normal personal identification number, the computer program product further comprising:
sending instructions for sending authorization for the account transaction to the vendor if the second electronic response was approval of the account transaction.

32. The computer program product of claim 22, wherein the first response was a normal personal identification number, the computer program product further comprising:
requesting instructions for requesting whether the account transaction is suspected unauthorized use if the second electronic response was refusal of the account transaction; and
receiving instructions for receiving a third electronic response indicating whether the refusal is due to suspected unauthorized use.

33. The computer program product of claim 32, wherein unauthorized use is selected from fraud, stolen transaction card, or combinations thereof.

34. The computer program product of claim 32, further comprising:
sending instructions for sending an instruction to the vendor refusing authorization if the third electronic response indicates that the refusal was not due to unauthorized use.

35. The computer program product of claim 32, wherein the third electronic response indicates that the refusal was due to suspected unauthorized use, the computer program product further comprises:
retrieving instructions for retrieving vendor preferences for unauthorized use from a validation database;
notifying instructions for notifying authorities as listed in the vendor preferences; and
sending instructions for sending an instruction to the vendor as directed in the vendor preferences, wherein the instruction is selected from approving authorization or refusing authorization.

36. The computer program product of claim 22, wherein the first electronic response was the duress personal identification number, the step of initiating instructions for initiating remedial actions further comprises:
retrieving instructions for retrieving account holder preferences for duress from a validation database;
notifying instructions for notifying authorities as listed in the account holder preferences, and
sending instructions for sending an instruction to vendor as listed in the account holder preferences, wherein the instruction is selected from approving authorization or refusing authorization.

37. The computer program product of claim 22, wherein the step of contacting instructions for contacting the account holder further comprises:
retrieving instructions for retrieving a contact address from an account holder preferences in a validation database;
contacting instructions for contacting the account holder at the contact address; and
requesting instructions for requesting the account holder to provide the personal identification number.

38. The computer program product of claim 37 further comprising:
informing instructions for informing the account holder of the pending account transaction; and
informing instructions for informing the account holder of a location and an amount for the account transaction.

39. The computer program product of claim 37, wherein the contact address is selected from a telephone number, a mobile telephone number, a pager number, an Internet address, an email address, an intranet address or combinations thereof.

40. A system for detecting unauthorized use of an account comprising:
means for receiving a first request from a vendor to authorize an account transaction;
means for sending a second request for authorization to an account holder;
means for receiving a first electronic response from the account holder providing a personal identification number selected from a normal personal identification number and a duress personal identification number; and
means for initiating remedial actions if the duress personal identification number is received.

41. The system of claim 40, further comprising:
means for requesting approval or refusal of the account transaction from the account holder via a validation request message; and
means for receiving a second electronic response from the account holder indicating approval or refusal of the account transaction.

42. The system of claim 40, wherein the first request contains information selected from an account number, an amount to be charged against the account, an amount to be debited from the account, a vendor code or combinations thereof.

43. The system of claim 42, further comprising:
means for retrieving information based upon the account number and the vendor code from a validation database, wherein the information is selected from an account holder record, a vendor record, or combinations thereof.

44. The system of claim 40, further comprising:
means for comparing the first response personal identification number with at least two stored personal identification numbers in an account holder preferences stored on a validation database;
means for confirming that the first response personal identification number matches one of the at least two stored personal identification numbers, and
means for determining from the comparison whether the first response personal identification number is the normal personal identification number or the duress personal identification number, wherein the at least two stored personal identification numbers include a stored normal personal identification number and a stored duress personal identification number.

45. The system of claim 41, wherein the first electronic response was the duress personal identification number, the step of initiating remedial actions further comprises:
means for retrieving account holder preferences for duress from a validation database;
means for notifying authorities as listed in the account holder preferences, and
means for sending an instruction to vendor as listed in the account holder preferences, wherein the instruction is selected from approving authorization or refusing authorization.

46. The system of claim 41, wherein the step of contacting the account holder further comprises:
means for retrieving a contact address from an account holder preferences in a validation database;
means for contacting the account holder at the contact address;
means for requesting the account holder to provide the personal identification number.

47. The system of claim 46, further comprising:
means for informing the account holder of the pending account transaction;
means for informing the account holder of a location and an amount for the account transaction.

* * * * *